F. E. KERSHNER.
SPOON HOLDER.
APPLICATION FILED JUNE 30, 1915.
1,211,171.
Patented Jan. 2, 1917.
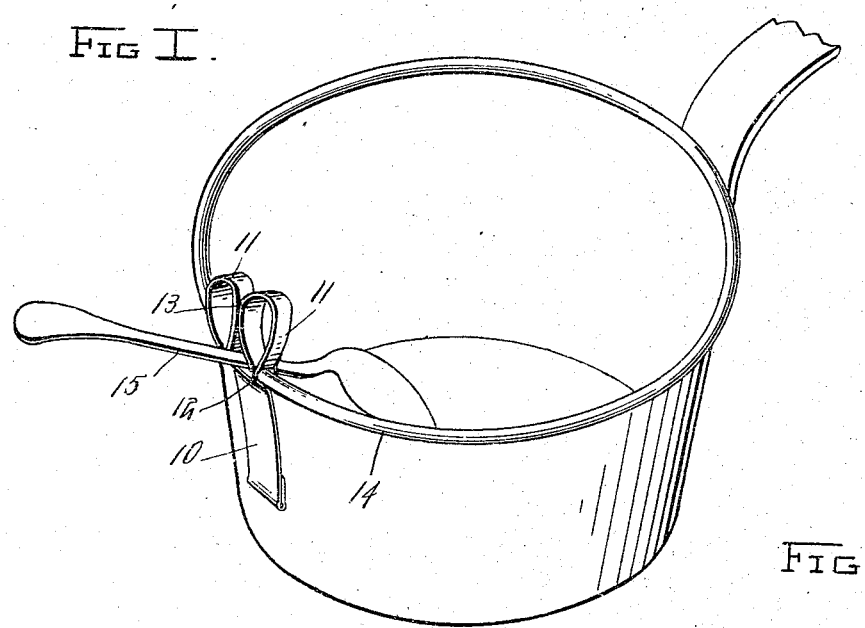
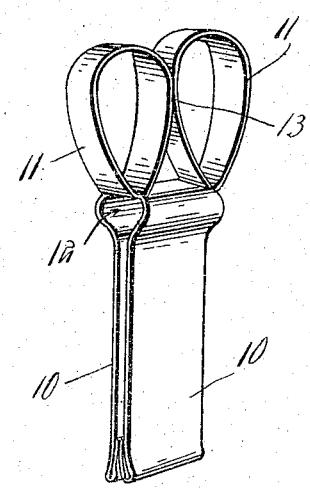
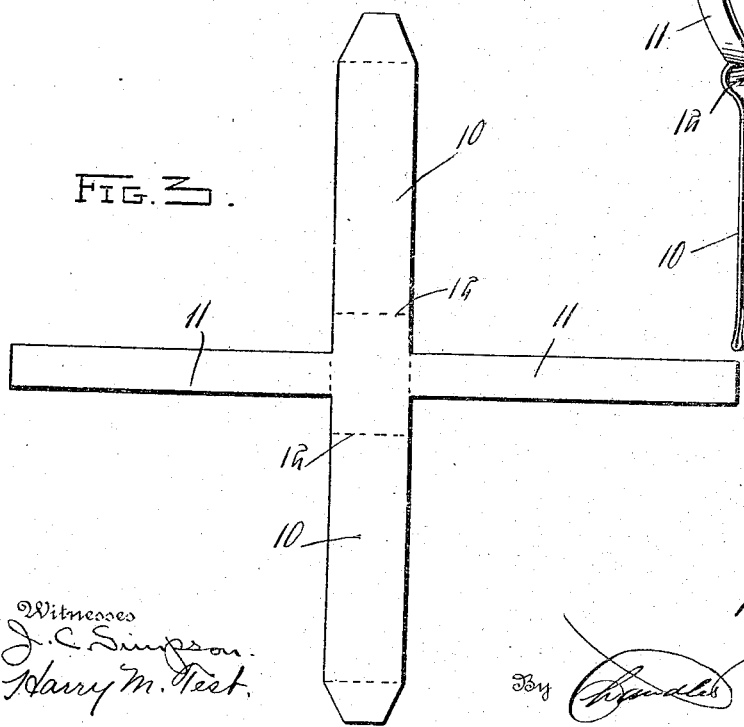
Witnesses
J. C. Simpson
Harry M. Test
Inventor
F. E. Kershner
By Chandlee & Chandlee
Attorneys

UNITED STATES PATENT OFFICE.

FRANCIS EUGENE KERSHNER, OF HENRY, WEST VIRGINIA.

SPOON-HOLDER.

1,211,171.  Specification of Letters Patent.  Patented Jan. 2, 1917.

Application filed June 30, 1915. Serial No. 37,329.

*To all whom it may concern:*

Be it known that I, FRANCIS E. KERSHNER, a citizen of the United States, residing at Henry, in the county of Grant, State of West Virginia, have invented certain new and useful Improvements in Spoon-Holders; and I do hereby declare the following to be a full, clear, and exact description of the invention, such as will enable others skilled in the art to which it appertains to make and use the same.

This invention relates to improvements in spoon holders or rests, and particularly to a spoon holder or rest for holding a spoon at the side of a pot or kettle so that the spoon will not fall down into the boiling contents therein.

Another object is to provide a device of this character which is extremely simple in construction, and which can be manufactured and sold at a low cost.

Other objects and advantages will be apparent from the following description when taken in connection with the accompanying drawing.

In the drawing: Figure 1 is a perspective view of the device applied to the edge of a stewing kettle, Fig. 2 is an enlarged perspective view of the device removed from the kettle, and Fig. 3 is a plan view of the blank from which the device is formed.

Referring particularly to the accompanying drawing, the device is formed of a single piece of metal of suitable thickness which is cross-shaped and includes the oppositely extending wide arms 10 and the intersecting arms 11 which are considerably narrower than the arms 10.

The device is folded on a line coincident with the axis of the arms 11 and this folded portion is formed into a tubular member 12. The arms 11 will then extend from the opposite ends of the upper side of this tubular member, from which they are bent upwardly and inwardly so that they resiliently engage each other at a point 13 over the middle of the tubular member 12. Thus the arms 10 of the blank become a pair of legs which are arranged to straddle the edge of the kettle 14, and the stem or handle of the spoon 15 is pressed down between the members 11 so that the spoon will be properly supported on the edge of the kettle and prevented from falling into the contents. This is very advantageous when boiling, such as syrups, jellies or the like and a small spoon is used.

While I have shown the device as made of a single blank of metal it will be understood that the same can as readily be made of wire without departing from the spirit of the invention.

What is claimed is:

As an article of manufacture, a spoon holder formed from a single piece of flat material doubled on itself to provide a pair of legs the connecting portion of which is formed into a cylindrical member, and a pair of elliptical arms bent from the opposite ends of the cylindrical member and extending vertically thereabove and having their mutually adjacent longer bowed sides resiliently contacting centrally above the cylindrical member.

In testimony whereof, I affix my signature, in the presence of two witnesses.

FRANCIS EUGENE KERSHNER.

Witnesses:
 HARRY SPIKER,
 J. M. SPIKER.

Copies of this patent may be obtained for five cents each, by addressing the "Commissioner of Patents, Washington, D. C."